United States Patent
Ishida

(10) Patent No.: US 11,866,635 B2
(45) Date of Patent: Jan. 9, 2024

(54) THERMOSETTING MATERIAL AND CURED PRODUCT

(71) Applicant: SEKISUI CHEMICAL CO., LTD., Osaka (JP)

(72) Inventor: Hiroya Ishida, Berkeley, CA (US)

(73) Assignee: SEKISUI CHEMICAL CO., LTD., Osaka (JP)

( * ) Notice: Subject to any disclaimer, the term of this patent is extended or adjusted under 35 U.S.C. 154(b) by 1 day.

(21) Appl. No.: 15/768,811

(22) PCT Filed: Nov. 10, 2016

(86) PCT No.: PCT/JP2016/083323
§ 371 (c)(1),
(2) Date: Apr. 16, 2018

(87) PCT Pub. No.: WO2017/086226
PCT Pub. Date: May 26, 2017

(65) Prior Publication Data
US 2018/0298263 A1 Oct. 18, 2018

(30) Foreign Application Priority Data
Nov. 19, 2015 (JP) ................................. 2015-226932

(51) Int. Cl.
| | |
|---|---|
| *C09K 5/14* | (2006.01) |
| *C08K 5/00* | (2006.01) |
| *C08K 3/013* | (2018.01) |
| *C08L 101/00* | (2006.01) |
| *C08K 3/38* | (2006.01) |
| *B82Y 30/00* | (2011.01) |
| *C08K 7/24* | (2006.01) |
| *C08K 3/00* | (2018.01) |
| *C08L 63/00* | (2006.01) |

(52) U.S. Cl.
CPC ............... *C09K 5/14* (2013.01); *B82Y 30/00* (2013.01); *C08K 3/00* (2013.01); *C08K 3/013* (2018.01); *C08K 3/38* (2013.01); *C08K 5/00* (2013.01); *C08K 5/0025* (2013.01); *C08K 7/24* (2013.01); *C08L 63/00* (2013.01); *C08L 101/00* (2013.01); *C08K 2003/385* (2013.01); *C08K 2201/005* (2013.01); *C08L 2203/20* (2013.01); *C08L 2205/025* (2013.01)

(58) Field of Classification Search
CPC . C08K 3/01; C08K 3/013; C08K 3/10; C08K 3/14; C08K 3/22; C08K 3/26; C08K 2003/2227; C08K 2003/285; C08K 2003/287; C08K 2003/385; C08K 7/02; C08K 7/04; C08K 7/16; C08K 13/04; C08K 13/02; C08K 2201/004; C08K 2201/005; C08K 2201/016; C09K 5/14; C08L 63/00; C08L 75/00; C08L 71/00; C08L 79/02; C08L 79/08; C08L 67/00; C08L 83/04; C08L 25/04; C08L 2203/20; C08L 2205/025
See application file for complete search history.

(56) References Cited

U.S. PATENT DOCUMENTS

| | | | | |
|---|---|---|---|---|
| 6,251,978 | B1* | 6/2001 | McCullough | C08K 7/00 524/495 |
| 2007/0054105 | A1* | 3/2007 | Hsiao | H01L 23/3733 428/292.1 |
| 2007/0241303 | A1* | 10/2007 | Zhong | C08K 3/38 252/62.3 T |
| 2012/0286194 | A1* | 11/2012 | Hirano | C09K 5/14 252/73 |
| 2013/0200299 | A1* | 8/2013 | Mazyar | E21B 43/128 977/734 |
| 2014/0080952 | A1* | 3/2014 | Raman | C08K 5/54 524/265 |
| 2014/0080954 | A1* | 3/2014 | Raman | C08K 3/34 524/404 |
| 2014/0339780 | A1* | 11/2014 | Mazyar | B26D 7/08 252/75 |
| 2015/0034858 | A1* | 2/2015 | Raman | B29C 45/0013 264/328.2 |
| 2015/0274930 | A1* | 10/2015 | Jon | C08K 3/10 423/290 |
| 2015/0319854 | A1 | 11/2015 | Kim et al. | |
| 2016/0325994 | A1* | 11/2016 | Qu | C01B 21/0648 |

(Continued)

FOREIGN PATENT DOCUMENTS

| | | | |
|---|---|---|---|
| CN | 103980664 A | 8/2014 | |
| CN | 104870557 A | 8/2015 | |
| JP | 2830301 B2 * | 12/1998 | ............. C08L 63/00 |

(Continued)

OTHER PUBLICATIONS

International Search Report for the Application No. PCT/JP2016/083323 dated Dec. 13, 2016.
Written Opinion of the International Searching Authority (PCT/ISA/237) for Application No. PCT/JP2016/083323 dated Dec. 13, 2016.
Written Opinion of the International Searching Authority (PCT/ISA/237) for Application No. PCT/JP2016/083323 dated Dec. 13, 2016 (English Translation mailed May 31, 2018).
Supplementary European Search Report for the Application No. EP 16 866 228.6 dated May 23, 2019.
The First Office Action for the Application No. 201680027264.3 from The State Intellectual Property Office of the People's Republic of China dated Dec. 10, 2019.
European Office Action for the Application No. 16 866 228.6 dated Jun. 23, 2020.
Su, Junlin et al., "Enhanced thermal conductivity in epoxy nanocomposites with hybrid boron nitride nanotubes and nanosheets", Physica Status Solidi. A: Applications and Materials Science, 2013, vol. 210, No. 12, pp. 2699-2705.

(Continued)

*Primary Examiner* — Jane L Stanley
(74) *Attorney, Agent, or Firm* — Cheng Law Group, PLLC

(57) ABSTRACT

There is provided a thermosetting material with which the heat-dissipating properties of a cured product can be considerably heightened and the mechanical strength of the cured product can also be heightened. The thermosetting material according to the present invention includes a thermosetting compound, a thermosetting agent, boron nitride nanotubes, and an insulating filler not being a nanotube.

14 Claims, 1 Drawing Sheet

(56) References Cited

U.S. PATENT DOCUMENTS

2017/0055339 A1* 2/2017 Zhang .................... C08J 9/0071

FOREIGN PATENT DOCUMENTS

| JP | 2008-258254 A | 10/2008 |
| JP | 2011-37918 A | 2/2011 |
| JP | 2011-241279 A | 12/2011 |
| JP | 2013-147600 A | 8/2013 |
| WO | WO-2008/123326 A1 | 10/2008 |
| WO | WO-2008/146400 A1 | 12/2008 |
| WO | WO 2015/167950 A1 * | 11/2015 ............... C08K 3/38 |

OTHER PUBLICATIONS

Wang, Xuebin et al., "Boron Nitride Nanosheets: novel Syntheses and Applications in polymeric Composites", Journal of Physics: Conference Series, 2013, vol. 471, pp. 1-10.

"Thermally conductive polymer materials", Edited by Zhou Wenying and Ding Xiaowei, National Defense Industry Press, 1st edition, 2014.

Decision of Refusal for the Application No. 201680027264.3 from The State Intellectual Property Office of the People's Republic of China dated Aug. 3, 2021.

The Fourth Office Action for the Application No. 201680027264.3 from The State Intellectual Property Office of the People's Republic of China dated Feb. 22, 2022.

* cited by examiner

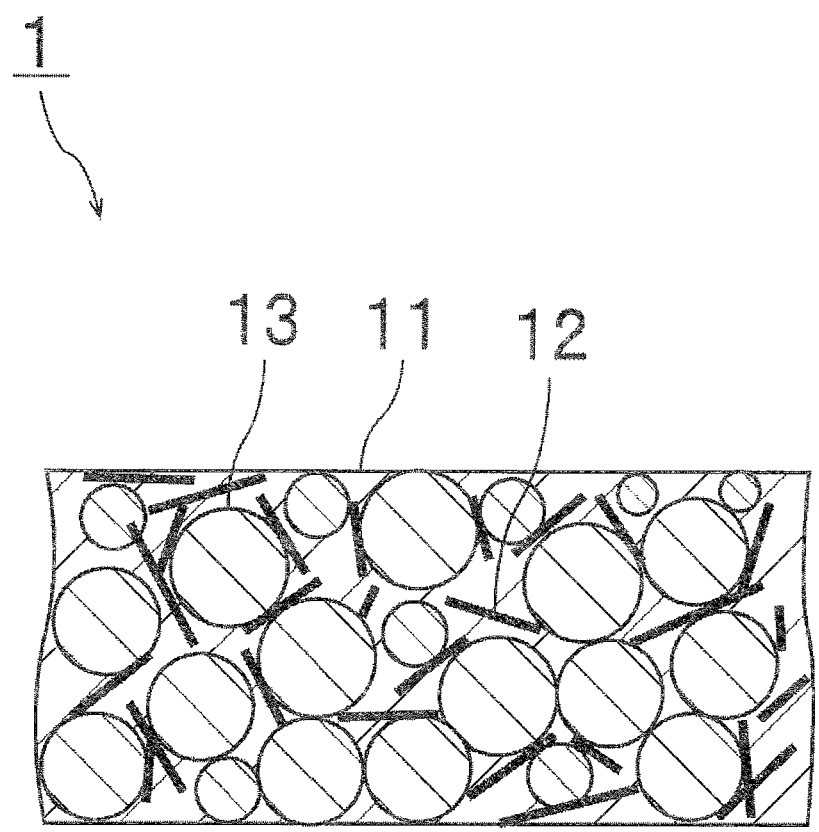

THERMOSETTING MATERIAL AND CURED PRODUCT

TECHNICAL FIELD

The present invention relates to a thermosetting material including a thermosetting compound, a thermosetting agent, and a specific filler component. Moreover, the present invention relates to a cured product of the thermosetting material.

BACKGROUND ART

In recent years, electrical equipment has been becoming smaller in size and more highly sophisticated. Accompanying this, the mounting density of electronic parts has been becoming high and there has been an increase in demand for the dissipation of heat generated from the electronic parts. In order to dissipate heat, a heat conductive composition containing a heat conductive filler has been used.

The following Patent Document 1 discloses a heat conductive adhesive including an insulating resin, aluminum nitride particles with an average particle diameter of 15 μm to 30 μm, and nearly spherical alumina particles with an average particle diameter of 0.5 μm to 2 μm. In the heat conductive adhesive, the mixing ratio (volume ratio) of the aluminum nitride particle to the nearly spherical alumina particle is 70:30 to 80:20. The total amount of the aluminum nitride particle and the nearly spherical alumina particle is 60 to 70% by volume relative to the total amount of the insulating resin, the aluminum nitride particle, and the nearly spherical alumina particle.

The following Patent Document 2 discloses an epoxy resin composition including an alicyclic epoxy resin, a phenolic novolac resin being a curing agent, titanium dioxide being a filling material, and a high heat conductivity material with a heat conductivity of 20 W/m·K or more being a filling material.

Moreover, the following Patent Document 3 discloses a heat conductive silicone composition containing (A) 100 parts by mass of an organopolysiloxane having at least two alkenyl groups in one molecule, (B) an organohydrogenpolysiloxane having at least two hydrogen atoms each of which is directly bonded to a silicon atom in an amount that the number of moles of the hydrogen atom directly bonded to a silicon atom is 0.1 to 5.0 times the number of moles of the alkenyl group originating in the component (A), (C) 1,200 to 6,500 parts by mass of a heat conductive filling material, and (D) 0.1 to 2,000 ppm of a platinum group metal-based curing catalyst in terms of mass of the platinum group metal element relative to the component (A). In the heat conductive silicone composition, the heat conductive filling material being the component (C) contains (C-i) 500 to 1,500 parts by mass of formless alumina having an average particle diameter of 10 to 30 μm, (C-ii) 150 to 4,000 parts by mass of spherical alumina having an average particle diameter of 30 to 85 μm, and (C-iii) 500 to 2,000 parts by mass of an insulating inorganic filler having an average particle diameter of 0.1 to 6 μm.

RELATED ART DOCUMENTS

Patent Documents

Patent Document 1: JP 2008-258245 A
Patent Document 2: JP 2011-241279 A
Patent Document 3: JP 2013-147600 A

SUMMARY OF THE INVENTION

Problems to be Solved by the Invention

In Patent Documents 1 and 2, in order to heighten the heat conductivity of a cured product, it is necessary for the cured product to be highly densely filled with filler. However, in Patent Documents 1 and 2, there is a limit to a range within which the blending amount of filler can be increased and the particle shape of the filler causes a large amount of a resin component to exist between two particles of the filler in contact with each other in the cured product. Moreover, even if a cured product is highly densely filled with filler, there are cases where the heat conductivity of the cured product fails to become sufficiently high. Moreover, when a cured product is attempted to be highly densely filled with filler, the viscosity of a composition is increased, the coating properties and the forming processability become poor, and the mechanical strength of the cured product is also lowered.

In Patent Document 3, the particle shape of the filler can cause some additional particles of the filler to be disposed between two particles of the filler in contact with each other in a cured product. However, even when the composition of Patent Document 3 is adopted, it is difficult to effectively heighten the heat conductivity of a cured product.

An object of the present invention is to provide a thermosetting material with which the heat-dissipating properties of a cured product can be considerably heightened and the mechanical strength of the cured product can also be heightened. Moreover, the present invention is also aimed at providing a cured product of the thermosetting material.

Means for Solving the Problems

In a broad aspect of the present invention, there is provided a thermosetting material including a thermosetting compound, a thermosetting agent, boron nitride nanotubes, and an insulating filler not being a nanotube.

In a specific aspect of the thermosetting material according to the present invention, the insulating filler has a heat conductivity of 10 W/m·K or more.

In a specific aspect of the thermosetting material according to the present invention, the content of the boron nitride nanotube is 0.1% by volume or more and 40% by volume or less in 100% by volume of the thermosetting material.

In a specific aspect of the thermosetting material according to the present invention, the content of the insulating filler is 25% by volume or more and 90% by volume or less in 100% by volume of the thermosetting material.

In a specific aspect of the thermosetting material according to the present invention, the ratio of the content of the boron nitride nanotube in 100% by volume of the thermosetting material to the content of the insulating filler in 100% by volume of the thermosetting material is 0.001 or more and 1.6 or less.

In a specific aspect of the thermosetting material according to the present invention, the average diameter of the boron nitride nanotube is 2 nm or more and 300 nm or less and the average length of the boron nitride nanotube is 1 μm or more and 200 μm or less.

In a specific aspect of the thermosetting material according to the present invention, the average particle diameter of the insulating filler is 1 μm or more and 100 μm or less.

In a specific aspect of the thermosetting material according to the present invention, the ratio of the average length
} of the boron nitride nanotube to the average particle diameter of the insulating filler is 0.01 or more and 200 or less.

In a specific aspect of the thermosetting material according to the present invention, the material of the insulating filler is alumina, synthetic magnesite, boron nitride, aluminum nitride, silicon nitride, silicon carbide, zinc oxide, or magnesium oxide.

In a specific aspect of the thermosetting material according to the present invention, the thermosetting material is a thermosetting sheet.

According to a broad aspect of the present invention, there is provided a cured product of the above-described thermosetting material.

Effect of the Invention

Since the thermosetting material according to the present invention includes a thermosetting compound, a thermosetting agent, boron nitride nanotubes, and an insulating filler not being a nanotube, the heat-dissipating properties of a cured product can be considerably heightened and the mechanical strength of the cured product can also be heightened.

BRIEF DESCRIPTION OF DRAWING

FIG. 1 is a sectional view schematically showing a cured product of the thermosetting material in accordance with one embodiment of the present invention.

MODE(S) FOR CARRYING OUT THE INVENTION

Hereinafter, the present invention will be described in detail.

The thermosetting material according to the present invention includes (A) a thermosetting compound, (B) a thermosetting agent, (C) boron nitride nanotubes (sometimes described as Boron Nitride Nanotubes or BNNTs), and (D) an insulating filler not being a nanotube (simply, sometimes described as (D) an insulating filler).

Since the above-mentioned composition is adopted in the present invention, the heat-dissipating properties of a cured product can be considerably heightened and the mechanical strength of the cured product can also be heightened. For example, by using (A) a thermosetting compound, (B) a thermosetting agent, (C) boron nitride nanotubes, and (D) an insulating filler in combination, the heat-dissipating properties and the mechanical strength are effectively heightened as compared with the case where these are not used in combination. In the present invention, both effects of high dissipating properties and high mechanical strength, which have hitherto been difficult to be simultaneously achieved, can be simultaneously achieved.

It is thought that the reason why such effects mentioned above are obtained is because (C) a boron nitride nanotube can be disposed between two particles of the (D) insulating filler, and furthermore, a particle of the (D) insulating filler can be brought into indirect contact with another particle of the (D) insulating filler with (C) a boron nitride nanotube interposed between the two particles.

Hereinafter, first, ingredients included in the thermosetting material according to the present invention will be described.

((A) Thermosetting Compound)

Examples of the (A) thermosetting compound include a styrene compound, a phenoxy compound, an oxetane compound, an epoxy compound, an episulfide compound, a (meth)acrylic compound, a phenol compound, an amino compound, an unsaturated polyester compound, a polyurethane compound, a silicone compound, a polyimide compound, and the like. One kind of the (A) thermosetting compound may be used alone and two or more kinds thereof may be used in combination.

As the (A) thermosetting compound, (A1) a thermosetting compound having a molecular weight of less than 10000 (simply, sometimes described as (A1) a thermosetting compound) may be used, (A2) a thermosetting compound having a molecular weight of 10000 or more (simply, sometimes described as (A2) a thermosetting compound) may be used, and both of (A1) a thermosetting compound and (A2) a thermosetting compound may be used.

In 100% by weight of ingredients included in the thermosetting material other than a solvent, the (C) boron nitride nanotubes, and the (D) insulating filler, the content of the (A) thermosetting compound is preferably 10% by weight or more, more preferably 20% by weight or more, preferably 90% by weight or less, more preferably 80% by weight or less, further preferably 70% by weight or less, especially preferably 60% by weight or less, and most preferably 50% by weight or less. When the content of the (A) thermosetting compound is the above lower limit or more, the adhesivity and heat resistance of a cured product are further heightened. When the content of the (A) thermosetting compound is the above upper limit or less, the coating properties at the time of preparing a thermosetting material are enhanced.

The ingredients included in the thermosetting material other than a solvent, the (C) boron nitride nanotubes, and the (D) insulating filler refer to ingredients other than the (C) boron nitride nanotubes and the (D) insulating filler when the thermosetting material includes no solvent and refer to ingredients other than a solvent, the (C) boron nitride nanotubes, and the (D) insulating filler when the thermosetting material includes the solvent.

(A1) Thermosetting Compound Having Molecular Weight of Less than 10000:

Examples of the (A1) thermosetting compound include a thermosetting compound having a cyclic ether group. Examples of the cyclic ether group include an epoxy group, an oxetanyl group, and the like. It is preferred that the thermosetting compound having a cyclic ether group be a thermosetting compound having an epoxy group or an oxetanyl group. One kind of the (A1) thermosetting compound may be used alone and two or more kinds thereof may be used in combination.

The (A1) thermosetting compound may include (A1a) a thermosetting compound having an epoxy group (simply, sometimes described as (A1a) a thermosetting compound) and may include (A1b) a thermosetting compound having an oxetanyl group (simply, sometimes described as (A1b) a thermosetting compound).

From the viewpoint of further enhancing the heat resistance and moisture resistance of a cured product, it is preferred that the (A1) thermosetting compound have an aromatic skeleton.

The aromatic skeleton is not particularly limited and examples thereof include a naphthalene skeleton, a fluorene skeleton, a biphenyl skeleton, an anthracene skeleton, a pyrene skeleton, a xanthene skeleton, an adamantane skeleton, a bisphenol A type skeleton, and the like. From the viewpoint of further enhancing the cooling/heating cycle resistance and heat resistance of a cured product, a biphenyl skeleton or a fluorene skeleton is preferred.

Examples of the (A1a) thermosetting compound include an epoxy monomer having a bisphenol skeleton, an epoxy monomer having a dicyclopentadiene skeleton, an epoxy monomer having a naphthalene skeleton, an epoxy monomer having an adamantane skeleton, an epoxy monomer having a fluorene skeleton, an epoxy monomer having a biphenyl skeleton, an epoxy monomer having a bi(glycidyloxyphenyl)methane skeleton, an epoxy monomer having a xanthene skeleton, an epoxy monomer having an anthracene skeleton, an epoxy monomer having a pyrene skeleton, and the like. A hydrogenated product thereof or a modified product thereof may be used. One kind of the (A1a) thermosetting compound may be used alone and two or more kinds thereof may be used in combination.

Examples of the epoxy monomer having a bisphenol skeleton include an epoxy monomer having a bisphenol skeleton of a bisphenol A type, a bisphenol F type, or a bisphenol S type, and the like.

Examples of the epoxy monomer having a dicyclopentadiene skeleton include dicyclopentadiene dioxide, a phenol novolac epoxy monomer having a dicyclopentadiene skeleton, and the like.

Examples of the epoxy monomer having a naphthalene skeleton include 1-glycidylnaphthalene, 2-glycidylnaphthalene, 1,2-diglycidylnaphthalene, 1,5-diglycidylnaphthalene, 1,6-diglycidylnaphthalene, 1,7-diglycidylnaphthalene, 2,7-diglycidylnaphthalene, triglycidylnaphthalene, 1,2,5,6-tetraglycidylnaphthalene, and the like.

Examples of the epoxy monomer having an adamantane skeleton include 1,3-bis(4-glycidyloxyphenyl)adamantane, 2,2-bis(4-glycidyloxyphenyl)adamantane, and the like.

Examples of the epoxy monomer having a fluorene skeleton include 9,9-bis(4-glycidyloxyphenyl)fluorene, 9,9-bis(4-glycidyloxy-3-methylphenyl)fluorene, 9,9-bis(4-glycidyloxy-3-chlorophenyl)fluorene, 9,9-bis(4-glycidyloxy-3-bromophenyl)fluorene, 9,9-bis(4-glycidyloxy-3-fluorophenyl) fluorene, 9,9-bis(4-glycidyloxy-3-methoxyphenyl) fluorene, 9,9-bis(4-glycidyloxy-3,5-dimethylphenyl) fluorene, 9,9-bis(4-glycidyloxy-3,5-dichlorophenyl)fluorene, 9,9-bis(4-glycidyloxy-3,5-dibromophenyl)fluorene, and the like.

Examples of the epoxy monomer having a biphenyl skeleton include 4,4'-diglycidylbiphenyl, 4,4'-diglycidyl-3,3',5,5'-tetramethylbiphenyl, and the like.

Examples of the epoxy monomer having a bi(glycidyloxyphenyl)methane skeleton include 1,1'-bi(2,7-glycidyloxynaphthyl)methane, 1,8'-bi(2,7-glycidyloxynaphthyl)methane, 1,1'-bi(3,7-glycidyloxynaphthyl)methane, 1,8'-bi(3,7-glycidyloxynaphthyl)methane, 1,1'-bi(3,5-glycidyloxynaphthyl)methane, 1,8'-bi(3,5-glycidyloxynaphthyl)methane, 1,2'-bi(2,7-glycidyloxynaphthyl)methane, 1,2'-bi(3,7-glycidyloxynaphthyl)methane, 1,2'-bi(3,5-glycidyloxynaphthyl)methane, and the like.

Examples of the epoxy monomer having a xanthene skeleton include 1,3,4,5,6,8-hexamethyl-2,7-bis-oxiranylmethoxy-9-phenyl-9H-xanthene, and the like.

Specific examples of the (A1b) thermosetting compound include 4,4'-bis[(3-ethyl-3-oxetanyl)methoxymethyl]biphenyl, 1,4-benzenedicarboxylic acid bis[(3-ethyl-3-oxetanyl) methyl]ester, 1,4-bis[(3-ethyl-3-oxetanyl)methoxymethyl] benzene, an oxetane-modified phenol novolac, and the like. One kind of the (A1b) thermosetting compound may be used alone and two or more kinds thereof may be used in combination.

From the viewpoint of further improving the heat resistance of a cured product, it is preferred that the (A1) thermosetting compound include a thermosetting compound having two or more cyclic ether groups.

From the viewpoint of further improving the heat resistance of a cured product, in 100% by weight of the (A1) thermosetting compound, the content of the thermosetting compound having two or more cyclic ether groups is preferably 70% by weight or more, more preferably 80% by weight or more, and 100% by weight or less. In 100% by weight of the (A1) thermosetting compound, the content of the thermosetting compound having two or more cyclic ether groups may be 10% by weight or more and 100% by weight or less. Moreover, the whole (A1) thermosetting compound may be constituted of a thermosetting compound having two or more cyclic ether groups.

The molecular weight of the (A1) thermosetting compound is less than 10000. The molecular weight of the (A1) thermosetting compound is preferably 200 or more, preferably 1200 or less, more preferably 600 or less, and further preferably 550 or less. When the molecular weight of the (A1) thermosetting compound is the above lower limit or more, the stickiness of the surface of a cured product is lowered and the handling properties of a curable composition are further enhanced. When the molecular weight of the (A1) thermosetting compound is the above upper limit or less, the adhesivity of a cured product is further heightened. Furthermore, a cured product is less liable to become hard and brittle and the adhesivity of the cured product is further heightened.

In this connection, in the present specification, the molecular weight of (A1) a thermosetting compound means a molecular weight that can be calculated from its structural formula when the (A1) thermosetting compound is not a polymer and when the structural formula of the (A1) thermosetting compound can be specified and means a weight average molecular weight when the (A1) thermosetting compound is a polymer.

In 100% by weight of ingredients included in the thermosetting material other than a solvent, the (C) boron nitride nanotubes, and the (D) insulating filler, the content of the (A1) thermosetting compound is preferably 10% by weight or more, more preferably 20% by weight or more, preferably 90% by weight or less, more preferably 80% by weight or less, further preferably 70% by weight or less, especially preferably 60% by weight or less, and most preferably 50% by weight or less. When the content of the (A1) thermosetting compound is the above lower limit or more, the adhesivity and heat resistance of a cured product are further heightened. When the content of the (A1) thermosetting compound is the above upper limit or less, the coating properties at the time of preparing a thermosetting material are enhanced.

(A2) Thermosetting Compound Having Molecular Weight of 10000 or More:

The (A2) thermosetting compound is a thermosetting compound having a molecular weight of 10000 or more. The (A2) thermosetting compound is generally a polymer because the (A2) thermosetting compound has a molecular weight of 10000 or more, and the molecular weight generally means a weight average molecular weight.

From the viewpoint of further enhancing the heat resistance and moisture resistance of a cured product, it is preferred that the (A2) thermosetting compound have an aromatic skeleton. When (A2) a thermosetting compound is a polymer and the (A2) thermosetting compound has an aromatic skeleton, the (A2) thermosetting compound needs only to have an aromatic skeleton at any portion of the whole polymer, may have an aromatic skeleton within its main chain skeleton, and may have an aromatic skeleton in its side chain. From the viewpoints of further enhancing the heat resistance of a cured product and further enhancing the moisture resistance of the cured product, it is preferred that the (A2) thermosetting compound have an aromatic skeleton within its main chain skeleton. One kind of the (A2) thermosetting compound may be used alone and two or more kinds thereof may be used in combination.

The aromatic skeleton is not particularly limited and examples thereof include a naphthalene skeleton, a fluorene skeleton, a biphenyl skeleton, an anthracene skeleton, a pyrene skeleton, a xanthene skeleton, an adamantane skeleton, a bisphenol A type skeleton, and the like. A biphenyl skeleton or a fluorene skeleton is preferred. In this case, the cooling/heating cycle resistance and heat resistance of a cured product are further enhanced.

The (A2) thermosetting compound is not particularly limited and examples thereof include a styrene resin, a phenoxy resin, an oxetane resin, an epoxy resin, an episulfide resin, a (meth)acrylic resin, a phenol resin, an amino resin, an unsaturated polyester resin, a polyurethane resin, a silicone resin, a polyimide resin, and the like.

From the viewpoints of suppressing the oxidative degradation of a cured product, further enhancing the cooling/heating cycle resistance and heat resistance of the cured product, and further lowering the water absorption ratio of the cured product, it is preferred that the (A2) thermosetting compound be a styrene resin, a phenoxy resin, or an epoxy resin, it is more preferred that the (A2) thermosetting compound be a phenoxy resin or an epoxy resin, and it is further preferred that the (A2) thermosetting compound be a phenoxy resin. In particular, by the use of a phenoxy resin or an epoxy resin, the heat resistance of a cured product is further enhanced. Moreover, by the use of a phenoxy resin, the elastic modulus of a cured product is further lowered and the cooling/heating cycle resistance of the cured product is further enhanced. In this connection, the (A2) thermosetting compound may not have a cyclic ether group such as an epoxy group.

As the styrene resin, specifically, a single polymer of a styrenic monomer, an interpolymer of a styrenic monomer and an acrylic monomer, and the like are usable. A styrenic polymer having a styrene-glycidyl methacrylate structural unit is preferred.

Examples of the styrenic monomer include styrene, o-methylstyrene, m-methylstyrene, p-methylstyrene, p-methoxystyrene, p-phenylstyrene, p-chlorostyrene, p-ethylstyrene, p-n-butylstyrene, p-tert-butylstyrene, p-n-hexylstyrene, p-n-octylstyrene, p-n-nonylstyrene, p-n-decylstyrene, p-n-dodecylstyrene, 2,4-dimethylstyrene, 3,4-dichlorostyrene, and the like.

Specifically, examples of the phenoxy resin include a resin obtained by making an epihalohydrin and a dihydric phenol compound react with each other and a resin obtained by making a divalent epoxy compound and a dihydric phenol compound react with each other.

It is preferred that the phenoxy resin have a bisphenol A type skeleton, a bisphenol F type skeleton, a bisphenol A/F mixed type skeleton, a naphthalene skeleton, a fluorene skeleton, a biphenyl skeleton, an anthracene skeleton, a pyrene skeleton, a xanthene skeleton, an adamantane skeleton, or a dicyclopentadiene skeleton. It is more preferred that the phenoxy resin have a bisphenol A type skeleton, a bisphenol F type skeleton, a bisphenol A/F mixed type skeleton, a naphthalene skeleton, a fluorene skeleton, or a biphenyl skeleton and it is further preferred that the phenoxy resin have at least one kind of skeleton among a fluorene skeleton and a biphenyl skeleton. By the use of a phenoxy resin having these preferred skeletons, the heat resistance of a cured product is still further enhanced.

The epoxy resin is an epoxy resin excluding the phenoxy resin. Examples of the epoxy resin include a styrene skeleton-containing epoxy resin, a bisphenol A type epoxy resin, a bisphenol F type epoxy resin, a bisphenol S type epoxy resin, a phenol novolac type epoxy resin, a biphenol type epoxy resin, a naphthalene type epoxy resin, a fluorene type epoxy resin, a phenol aralkyl type epoxy resin, a naphthol aralkyl type epoxy resin, a dicyclopentadiene type epoxy resin, an anthracene type epoxy resin, an epoxy resin having an adamantane skeleton, an epoxy resin having a tricyclodecane skeleton, an epoxy resin having a triazine nucleus in its skeleton, and the like.

The molecular weight of the (A2) thermosetting compound is 10000 or more. The molecular weight of the (A2) thermosetting compound is preferably 30000 or more, more preferably 40000 or more, preferably 1000000 or less, and more preferably 250000 or less. When the molecular weight of the (A2) thermosetting compound is the above lower limit or more, a cured product is less liable to be thermally deteriorated. When the molecular weight of the (A2) thermosetting compound is the above upper limit or less, the compatibility between the (A2) thermosetting compound and another ingredient is heightened. As a result, the heat resistance of a cured product is further enhanced.

In 100% by weight of ingredients included in the thermosetting material other than a solvent, the (C) boron nitride nanotubes, and the (D) insulating filler, the content of the (A2) thermosetting compound is preferably 20% by weight or more, more preferably 30% by weight or more, preferably 60% by weight or less, and more preferably 50% by weight or less. When the content of the (A2) thermosetting compound is the above lower limit or more, the handling properties of the thermosetting material are improved. When the content of the (A2) thermosetting compound is the above upper limit or less, the (C) boron nitride nanotubes and the (D) insulating filler are easily dispersed.

((B) Thermosetting Agent)

The (B) thermosetting agent is not particularly limited. As the (B) thermosetting agent, an appropriate thermosetting agent that enables (A) a thermosetting compound to be cured can be used. Moreover, in the present specification, a curing catalyst is included in the (B) thermosetting agent. One kind of the (B) thermosetting agent may be used alone and two or more kinds thereof may be used in combination.

From the viewpoint of further enhancing the heat resistance of a cured product, it is preferred that the (B) thermosetting agent have an aromatic skeleton or an alicyclic skeleton. It is preferred that the (B) thermosetting agent include an amine curing agent (amine compound), an imidazole curing agent, a phenol curing agent (phenol compound), or an acid anhydride curing agent (acid anhydride) and it is more preferred that the (B) thermosetting agent include an amine curing agent. It is preferred that the acid anhydride curing agent contain an acid anhydride having an aromatic skeleton, a hydrogenated product of the acid anhydride, or a modified product of the acid anhydride or contain an acid anhydride having an alicyclic skeleton, a hydrogenated product of the acid anhydride, or a modified product of the acid anhydride.

Examples of the amine curing agent include dicyandiamide, an imidazole compound, diaminodiphenylmethane, diaminodiphenylsulfone, and the like. From the viewpoint of further heightening the adhesivity of a cured product, it is more preferred that the amine curing agent be dicyandiamide or an imidazole compound. From the viewpoint of further enhancing the storage stability of a curable composition, it is preferred that the (B) thermosetting agent include a curing agent having a melting point of 180° C. or more and it is more preferred that the (B) thermosetting agent include an amine curing agent having a melting point of 180° C. or more.

Examples of the imidazole curing agent include 2-undecylimidazole, 2-heptadecylimidazole, 2-methylimidazole, 2-ethyl-4-methylimidazole, 2-phenylimidazole, 2-phenyl-4-methylimidazole, 1-benzyl-2-methylimidazole, 1-benzyl-2-phenylimidazole, 1,2-dimethylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-methylimidazole isocyanuric acid adduct, 2-phenyl-4,5-dihydroxymethylimidazole, 2-phenyl-4-methyl-5-dihydroxymethylimidazole, and the like.

Examples of the phenol curing agent include a phenol novolac, o-cresol novolac, p-cresol novolac, t-butylphenol novolac, dicyclopentadiene cresol, poly-para-vinylphenol, bisphenol A type novolac, a xylylene-modified novolac, a decalin-modified novolac, poly(di-o-hydroxyphenyl)methane, poly(di-m-hydroxyphenyl)methane, poly(di-p-hydroxyphenyl)methane, and the like. From the viewpoint of further enhancing the flexibility of a cured product and the flame retardant properties of the cured product, a phenol resin having a melamine skeleton, a phenol resin having a triazine skeleton, or a phenol resin having an allyl group is preferred.

Examples of a commercial product of the phenol curing agent include MEH-8005, MEH-8010, and MEH-8015 (any of these above is available from Meiwa Plastic Industries, Ltd.), YLH903 (available from Mitsubishi Chemical Corporation), LA-7052, LA-7054, LA-7751, LA-1356, and LA-3018-50P (any of these above is available from DIC Corporation), PS6313 and PS6492 (any of these above is available from Gun Ei Chemical Industry Co., Ltd.), and the like.

Examples of the acid anhydride having an aromatic skeleton, the hydrogenated product of the acid anhydride, or the modified product of the acid anhydride include a styrene/maleic anhydride copolymer, benzophenonetetracarboxylic anhydride, pyromellitic anhydride, trimellitic anhydride, 4,4'-oxydiphthalic anhydride, phenylethynylphthalic anhydride, glycerol bis(anhydrotrimellitate)monoacetate, ethylene glycol bis(anhydrotrimellitate), methyl tetrahydrophthalic anhydride, methyl hexahydrophthalic anhydride, a trialkyl tetrahydrophthalic anhydride, and the like.

Examples of a commercial product of the acid anhydride having an aromatic skeleton, the hydrogenated product of the acid anhydride, or the modified product of the acid anhydride include SMA Resin EF30, SMA Resin EF40, SMA Resin EF60, and SMA Resin EF80 (any of these above is available from Arkema K. K. technical center in Yokohama, Japan), ODPA-M and PEPA (any of these above is available from Manac Incorporated), RIKACID MTA-10, RIKACID MTA-15, RIKACID TMTA, RIKACID TMEG-100, RIKACID TMEG-200, RIKACID TMEG-300, RIKACID TMEG-500, RIKACID TMEG-S, RIKACID TH, RIKACID HT-1A, RIKACID HH, RIKACID MH-700, RIKACID MT-500, RIKACID DSDA, and RIKACID TDA-100 (any of these above is available from New Japan Chemical Co., Ltd.), EPICLON B4400, EPICLON B650, and EPICLON B570 (any of these above is available from DIC Corporation), and the like.

It is preferred that the acid anhydride having an alicyclic skeleton, the hydrogenated product of the acid anhydride, or the modified product of the acid anhydride be an acid anhydride having a polyalicyclic skeleton, a hydrogenated product of the acid anhydride, or a modified product of the acid anhydride, or an acid anhydride having an alicyclic skeleton obtained by an addition reaction of a terpene-based compound with maleic anhydride, a hydrogenated product of the acid anhydride, or a modified product of the acid anhydride. By the use of these curing agents, the flexibility of a cured product and the moisture resistance and adhesivity of the cured product are further enhanced.

Examples of the acid anhydride having an alicyclic skeleton, the hydrogenated product of the acid anhydride, or the modified product of the acid anhydride also include methylnadic anhydride, an acid anhydride having a dicyclopentadiene skeleton, or a modified product of the acid anhydride, and the like.

Examples of a commercial product of the acid anhydride having an alicyclic skeleton, the hydrogenated product of the acid anhydride, or the modified product of the acid anhydride include RIKACID HNA and RIKACID HNA-100 (any of these above is available from New Japan Chemical Co., Ltd.), Epicure YH306, Epicure YH307, Epicure YH308H, and Epicure YH309 (any of these above is available from Mitsubishi Chemical Corporation), and the like.

It is also preferred that the (B) thermosetting agent be methylnadic anhydride or a trialkyl tetrahydrophthalic anhydride. By the use of methylnadic anhydride or a trialkyl tetrahydrophthalic anhydride, the water resistance of a cured product is enhanced.

In 100% by weight of ingredients included in the thermosetting material other than a solvent, the (C) boron nitride nanotubes, and the (D) insulating filler, the content of the (B) thermosetting agent is preferably 0.1% by weight or more, more preferably 1% by weight or more, preferably 40% by weight or less, and more preferably 25% by weight or less. When the content of the (B) thermosetting agent is the above lower limit or more, the thermosetting material is easy to be sufficiently cured.

When the content of the (B) thermosetting agent is the above upper limit or less, an excess of the (B) thermosetting agent not taking part in the curing is less liable to be generated. As such, the heat resistance and adhesivity of a cured product are further enhanced.

((C) Boron Nitride Nanotubes)

The (C) boron nitride nanotube is a nanotube. The material of the (C) boron nitride nanotube is boron nitride. The shape of the (C) boron nitride nanotube is a tube-like shape. Examples of an ideal shape thereof include the shape of a single-walled tube or a multi-walled tube formed by arranging planes of a hexagonal mesh shape in parallel with the tube axis to be formed into a tube.

From the viewpoint of effectively heightening the heat-dissipating properties and the mechanical strength, the average diameter of the (C) boron nitride nanotube is preferably 2 nm or more, more preferably 6 nm or more, further preferably 10 nm or more, especially preferably 30 nm or more, preferably 300 nm or less, more preferably 200 nm or less, further preferably 100 nm or less, and especially preferably 50 nm or less.

The average diameter refers to an average outer diameter in the case of a single-walled tube and means an average outer diameter of a tube wall positioned at the outermost side in the case of a multi-walled tube.

From the viewpoint of effectively heightening the heat-dissipating properties and the mechanical strength, the average length of the (C) boron nitride nanotube is preferably 1 μm or more, preferably 200 μm or less, more preferably 150 μm or less, further preferably 100 μm or less, and especially preferably 80 μm or less.

The synthesis method, the temperature at the time of the synthesis, the time period for the synthesis, and the like can be changed to make the (C) boron nitride nanotube appropriately vary in its diameter or length. For example, an arc-discharge method can be adopted to obtain a nanotube with a small diameter and a chemical vapor deposition method can be adopted to obtain a nanotube with a large diameter.

The aspect ratio of the (C) boron nitride nanotube is preferably 3 or more. The upper limit of the aspect ratio of the (C) boron nitride nanotube is not particularly limited. The aspect ratio of the (C) boron nitride nanotube may be 100000 or less.

From the viewpoint of effectively heightening the heat-dissipating properties and the mechanical strength, the ratio of an average length of the (C) boron nitride nanotube to an average particle diameter of the (D) insulating filler is preferably 0.01 or more, more preferably 0.2 or more, preferably 200 or less, and more preferably 10 or less.

The average diameter, the average length, and the aspect ratio can be determined by electron microscope observation. For example, observation by a TEM (transmission electron microscope) is performed, and directly from an electron micrograph obtained, the diameter and length of the (C) boron nitride nanotube can be measured. Moreover, for example, the cross-section of a fiber cut in parallel with the axis can be observed by a TEM (transmission electron microscope) to grasp the form of the (C) boron nitride nanotube in the thermosetting material. It is preferred that the average diameter, the average length, and the aspect ratio be determined from the respective arithmetic average values of arbitrary 50 fibers in the electron micrograph.

The (C) boron nitride nanotube can be synthesized by an arc-discharge method, a laser beam heating method, a chemical vapor deposition method, or the like. Moreover, a method of using nickel boride as a catalyst and borazine as a raw material to synthesize a boron nitride nanotube is also known. Moreover, a method of utilizing a carbon nanotube as a mold and making boron oxide react with nitrogen to synthesize a boron nitride nanotube is also known. The (C) boron nitride nanotube is not limited to those obtained by each of these synthesis methods. The (C) boron nitride nanotube may be a boron nitride nanotube treated with a strong acid or a chemically modified boron nitride nanotube.

By controlling the electrical charge on the surface of the (C) boron nitride nanotube, (C) boron nitride nanotubes can be made to efficiently accumulate on the surface of the (D) insulating filler and (C) boron nitride nanotubes can be brought into contact with the (D) insulating filler. In order to attain such an effect, it is preferred that the (C) boron nitride nanotube be a boron nitride nanotube surface-treated with a coupling agent or a boron nitride nanotube having an amino group on its surface. Moreover, in order to reduce the thermal resistance at the interface between a resin component and the (C) boron nitride nanotube, it is also preferred that the (C) boron nitride nanotube have a conjugated polymer on its surface.

The conjugated polymer refers to a molecule in which double bond units and single bond units are alternately continued. It is preferred that the (C) boron nitride nanotube have a boron nitride nanotube body and a conjugated macromolecule disposed on the surface of the boron nitride nanotube body. There is a strong interaction between the conjugated polymer and the boron nitride nanotube body. Moreover, when the (A) thermosetting compound contains a phenoxy resin, the interaction between the conjugated polymer and the phenoxy resin can be strengthened.

Examples of the conjugated polymer include a polyphenylene vinylene polymer, a polythiophene polymer, a polyphenylene polymer, a polypyrrole polymer, a polyaniline polymer, a polyacetylene polymer, and the like. A polyphenylene vinylene polymer or a polythiophene polymer is preferred.

A method of covering a boron nitride nanotube body with the conjugated polymer is not particularly limited and examples thereof include 1) a method of adding a boron nitride nanotube body to a melted conjugated polymer and solventlessly mixing the contents, 2) a method of mixing and dispersing a boron nitride nanotube body and a conjugated polymer in a solvent that can dissolve the conjugated polymer, and the like. In the method of 2), examples of a method of dispersing the boron nitride nanotube body include a dispersing method by ultrasonic waves, various kinds of stirring methods, and the like. Examples of the stirring method include a stirring method by a homogenizer, a stirring method by an attritor, a stirring method by a ball mill, and the like.

In 100% by volume of ingredients included in the thermosetting material other than a solvent, that is, in 100% by volume of a cured product, the content of the (C) boron nitride nanotube is preferably 0.1% by volume or more, more preferably 1% by volume or more, preferably 40% by volume or less, and more preferably 20% by volume or less. When the content of the (C) boron nitride nanotube is the above lower limit or more, the heat-dissipating properties and the mechanical strength are effectively heightened. When the content of the (C) boron nitride nanotube is the above upper limit or less, the thermosetting material is easy to be sufficiently cured. When the content of the (C) boron nitride nanotube is the above upper limit or less, the heat conductivity exhibited by a cured product and the adhesivity are further heightened.

The ingredients included in the thermosetting material other than a solvent refer to a thermosetting material when the thermosetting material contains no solvent and refer to ingredients other than a solvent when the thermosetting material contains the solvent.

From the viewpoint of effectively heightening the heat-dissipating properties and the mechanical strength, the ratio of a content of the (C) boron nitride nanotube in 100% by volume of the thermosetting material to a content of the (D) insulating filler in 100% by volume of the thermosetting material is preferably 0.001 or more, more preferably 0.02 or more, preferably 1.6 or less, and more preferably 1.0 or less.

((D) Insulating Filler not being Nanotube)

The (D) insulating filler has insulating properties. The (D) insulating filler may be an organic filler and may be an inorganic filler. From the viewpoint of effectively heightening the heat-dissipating properties, it is preferred that the (D) insulating filler be an inorganic filler. From the viewpoint of effectively heightening the heat-dissipating properties, it is preferred that the (D) insulating filler have a heat conductivity of 10 W/m·K or more. One kind of the (D) insulating filler may be used alone and two or more kinds thereof may be used in combination. In this connection, with regard to the filler, having insulating properties means having a volume resistivity of $10^6$ Ω·cm or more.

From the viewpoint of further heightening the heat-dissipating properties of a cured product, the heat conductivity of the (D) insulating filler is preferably 10 W/m·K or more, more preferably 15 W/m·K or more, and further preferably 20 W/m·K or more. The upper limit of the heat conductivity of the (D) insulating filler is not particularly limited. An inorganic filler with a heat conductivity of 300 W/m·K or so has been widely known, and moreover, an inorganic filler with a heat conductivity of 200 W/m·K or so is easily available.

It is preferred that the material of the (D) insulating filler be alumina, synthetic magnesite, boron nitride, aluminum nitride, silicon nitride, silicon carbide, zinc oxide, or magnesium oxide and it is more preferred that the material thereof be alumina, boron nitride, aluminum nitride, silicon nitride, silicon carbide, zinc oxide, or magnesium oxide. By the use of these kinds of preferred insulating filler, the heat-dissipating properties of a cured product are further heightened.

It is preferred that the (D) insulating filler be constituted of spherical particles or spherical particles in which independent particles of the insulating filler are aggregated with one another. By the use of these kinds of insulating filler, the heat-dissipating properties of a cured product are further heightened. The aspect ratio of the spherical particle is 2 or less.

The new Mohs hardness of the material of the (D) insulating filler is preferably 12 or less and more preferably 9 or less. When the new Mohs hardness of the material of the (D) insulating filler is 9 or less, the processability of a cured product is further enhanced.

From the viewpoint of further enhancing the processability of a cured product, it is preferred that the material of the (D) insulating filler be synthetic magnesite, crystalline silica, zinc oxide, or magnesium oxide. The new Mohs hardness of the material of each of these kinds of inorganic filler is 9 or less.

From the viewpoint of effectively heightening the heat-dissipating properties, the average particle diameter of the (D) insulating filler is preferably 1 m or more and preferably 100 μm or less. When the average particle diameter is the above lower limit or more, a cured product can be easily filled highly densely with the (D) insulating filler. When the average particle diameter is the above upper limit or less, the voltage endurance of a cured product is further heightened.

The above-mentioned "average particle diameter" refers to an average particle diameter determined from the result of the volume average particle size distribution measurement performed using a laser diffraction type particle size distribution measuring apparatus.

In 100% by volume of ingredients included in the thermosetting material other than a solvent, that is, in 100% by volume of a cured product, the content of the (D) insulating filler is preferably 25% by volume or more, more preferably 30% by volume or more, preferably 90% by volume or less, and more preferably 80% by volume or less. When the content of the (D) insulating filler is the above lower limit or more and the above upper limit or less, the heat-dissipating properties and mechanical strength of a cured product are effectively heightened.

(Other Ingredients)

Other than the above-described ingredients, the thermosetting material may include other ingredients, which are generally used for a thermosetting composition and a thermosetting sheet, such as a dispersant, a chelating agent, and an oxidation inhibitor.

(Other Details of Thermosetting Material and Cured Product)

The thermosetting material may be a thermosetting paste and may be a thermosetting sheet.

From the viewpoint of effectively heightening the heat-dissipating properties and the mechanical strength, in the thermosetting material, it is preferred that 1% or more (preferably 3% or more, and more preferably 5% or more) of the total number of particles of the (D) insulating filler have (C) a boron nitride nanotube which is brought into contact with the surface of the (D) insulating filler. From the viewpoint similar to the above, in the thermosetting material, it is preferred that 90% or less (preferably 85% or less, and more preferably 80% or less) of the total number of particles of the (D) insulating filler have (C) a boron nitride nanotube which is brought into contact with the surface of the (D) insulating filler. In order to increase the amount of (C) boron nitride nanotubes which are brought into contact with the surface of the (D) insulating filler, it is preferred that (C) boron nitride nanotubes be made to adhere to particles of the (D) insulating filler beforehand to blend a mixture of the (C) boron nitride nanotube and the (D) insulating filler with other ingredients.

From the viewpoint of effectively heightening the heat-dissipating properties and the mechanical strength, in the thermosetting sheet, it is preferred that 1% or more (preferably 3% or more, and more preferably 5% or more) of the total number of particles of the (D) insulating filler be brought into direct contact with another particle of the insulating filler or be brought into indirect contact with another particle of the insulating filler via the boron nitride nanotube interposed between the particles. From the viewpoint similar to the above, in the thermosetting sheet, it is preferred that 90% or less (preferably 85% or less, and more preferably 80% or less) of the total number of particles of the (D) insulating filler be brought into direct contact with another particle of the insulating filler or be brought into indirect contact with another particle of the insulating filler via the boron nitride nanotube interposed between the particles. The judgment whether the insulating filler and the boron nitride nanotube are brought into contact with each other or not can be conducted by an element mapping method using an energy dispersive X-ray spectroscopic analyzer (SEM-EDS).

Three portions obtained when the thermosetting sheet is divided into three equal portions in the thickness direction are defined as a first surface side portion, a central portion, and a second surface side portion. From the viewpoint of effectively heightening the heat-dissipating properties and the mechanical strength in the whole cured product, the ratio of a content of the boron nitride nanotube in the first surface side portion to a content of the boron nitride nanotube in the central portion is preferably 0.5 or more, more preferably 1.0 or more, preferably 2.0 or less, and more preferably 1.5 or less. From the viewpoint of effectively heightening the heat-dissipating properties and the mechanical strength in the whole cured product, the ratio of a content of the boron nitride nanotube in the second surface side portion to a content of the boron nitride nanotube in the central portion is preferably 0.5 or more, more preferably 1.0 or more, preferably 2.0 or less, and more preferably 1.5 or less.

The cured product according to the present invention is a cured product of the thermosetting material and is obtained by curing the thermosetting material.

FIG. 1 is a sectional view schematically showing a cured product of the thermosetting material in accordance with one embodiment of the present invention. In this connection, in FIG. 1, for convenience of illustration, the size of the ingredient is different from an actual size thereof and the thickness of the cured product is different from an actual thickness thereof.

The cured product 1 shown in FIG. 1 includes a cured product portion 11, a boron nitride nanotube 12, and an insulating filler 13. The insulating filler 13 is not a nanotube. The cured product portion 11 is a portion formed when a thermosetting component containing a thermosetting compound and a thermosetting agent is cured and is obtained by curing the thermosetting component.

The thermosetting material and the cured product can be used in various applications where high heat-dissipating properties, high mechanical strength, and the like are required. For example, the cured product is arranged between a heat generation component and a heat dissipation component to be used in electronic equipment.

From the viewpoint of effectively heightening the heat-dissipating properties and the mechanical strength, in the cured product, it is preferred that 1% or more (preferably 3% or more, and more preferably 5% or more) of the total number of particles of the (D) insulating filler be brought into direct contact with another particle of the insulating filler or be brought into indirect contact with another particle of the insulating filler via the boron nitride nanotube interposed between the particles. From the viewpoint similar to the above, in the cured product, it is preferred that 90% or less (preferably 85% or less, and more preferably 80% or less) of the total number of particles of the (D) insulating filler be brought into direct contact with another particle of the insulating filler or be brought into indirect contact with another particle of the insulating filler via the boron nitride nanotube interposed between the particles.

Three portions obtained when the cured product is divided into three equal portions in the thickness direction are defined as a first surface side portion, a central portion, and a second surface side portion. From the viewpoint of effectively heightening the heat-dissipating properties and the mechanical strength in the whole cured product, the ratio of a content of the boron nitride nanotube in the first surface side portion to a content of the boron nitride nanotube in the central portion is preferably 0.5 or more, more preferably 1.0 or more, preferably 2.0 or less, and more preferably 1.5 or less. From the viewpoint of effectively heightening the heat-dissipating properties and the mechanical strength in the whole cured product, the ratio of a content of the boron nitride nanotube in the second surface side portion to a content of the boron nitride nanotube in the central portion is preferably 0.5 or more, more preferably 1.0 or more, preferably 2.0 or less, and more preferably 1.5 or less.

Hereinafter, the present invention will be elucidated with reference to specific examples of the present invention and comparative examples. The present invention is not limited to the following examples.

(Production of Boron Nitride Nanotubes)

In a boron nitride-made crucible, boron, magnesium oxide, and iron oxide in a mole ratio of 2:1:1 were placed and the crucible was heated to 1300° C. in a high frequency induction heating furnace (heating process 1). Into the product, ammonia gas was introduced and heated for 2 hours at 1200° C. (heating process 2). The obtained white solid matter was washed with concentrated hydrochloric acid, washed with ion-exchanged water until the water was neutral, and then, dried to obtain boron nitride nanotubes (BNNTs) (A). The obtained BNNTs were determined to have an average diameter of 15 nm and an average length of 50 μm.

Moreover, boron nitride nanotubes (BNNTs) (B) were obtained in the same manner as above except that the temperature in the heating process 1 was set to 600° C. and the heating process 1 was changed to a process of mixing the contents for 50 hours while crushing the contents with a heat resistant ball mill. The obtained BNNTs were determined to have an average diameter of 250 nm and an average length of 3 μm.

Examples 1 to 12 and Comparative Examples 1 to 3

To prepare a matrix resin, 50 parts by weight of a bisphenol A type phenoxy resin as a polymer, 30 parts by weight of a bisphenol A type epoxy resin as an epoxy resin, 15 parts by weight of a mixture of an alicyclic skeleton acid anhydride ("RIKACID MH-700" available from New Japan Chemical Co., Ltd.) and dicyandiamide as curing agents, and 5 parts by weight of an epoxysilane coupling agent as an additive were blended. To the matrix resin, boron nitride nanotubes and an insulating filler in a blending ratio (the unit is % by volume) shown in the following Table 1 were added and kneaded with a homogenizing disperser type mixer to obtain a paste (thermosetting material).

Onto a releasable PET sheet with a thickness of 50 μm, the thermosetting material was applied so that the thickness becomes 200 μm and dried for 30 minutes in an oven at 90° C. to prepare a thermosetting sheet on the PET sheet.

(Evaluation)

(1) Measurement of Heat Conductivity

A thermosetting sheet was subjected to a warming treatment for 1 hour in an oven at 120° C. and then subjected to a warming treatment for 1 hour in an oven at 200° C. to cure the thermosetting sheet and a cured product sheet was obtained. The cured product sheet was measured for the heat conductivity using a thermal conductivity meter available from Kyoto Electronics Manufacturing Co., Ltd. "Quick Thermal Conductivity Meter QTM-500". Moreover, a cured product sheet of Comparative Example 1 was measured for the heat conductivity in the same manner as above. The heat conductivity of the cured product sheet of Comparative Example 1 was defined as 1.0 and each of the heat conductivities of cured product sheets of examples and other comparative examples was compared therewith. A ratio (heat conductivity ratio) of the heat conductivity in each of the respective examples and comparative examples (excluding Comparative Example 1) to the heat conductivity in Comparative Example 1 was determined.

(2) Mechanical Strength

A thermosetting sheet was sandwiched between an aluminum plate with a thickness of 1.5 mm and a sheet of electrolytic copper foil with a thickness of 35 μm and the thermosetting sheet was press-cured for 1 hour at 120° C., and furthermore, for 1 hour at 200° C. while being applied with a pressure of 4 MPa by means of a vacuum press machine to prepare a copper-clad laminated plate. With the use of the obtained copper-clad laminated plate, a bending test was performed by a three-point support method. A cycle in which a test specimen is bent so as to have a depth of 20 μm once per second was repeated 1000 times and the degree of peeling of a cured product sheet from a basal plate was judged according to the following criteria.

[Criteria for Judgment in Mechanical Strength]

◯◯: In an area that accounts for less than 5% of the sheet area, the occurrence of peeling is observed.

◯: In an area that accounts for 5% or more and less than 10% of the sheet area, the occurrence of peeling is observed.

Δ: In an area that accounts for 10% or more and less than 20% of the sheet area, the occurrence of peeling is observed.

x: In an area that accounts for 20% or more of the sheet area, the occurrence of peeling is observed.

TABLE 1

| | Resin/ BNNT/Filler Blending Ratio (% by volume) | BNNT/Filler Blending Ratio | BNNT Kind | Filler Kind | Filler Shape | Filler Heat Conductivity (W/m·K) | Filler Average Particle Diameter (μm) | Evaluation Heat Conductivity Ratio | Evaluation Mechanical Strength |
|---|---|---|---|---|---|---|---|---|---|
| Ex. 1 | 69.5/0.5/30 | 0.017 | A | Boron Nitride | Plate-like Shape | 60 | 80 | 1.3 | ◯◯ |
| Ex. 2 | 69.5/0.5/30 | 0.017 | A | Boron Nitride | Plate-like Shape | 60 | 80 | 1.5 | ◯◯ |
| Ex. 3 | 69/1/30 | 0.033 | A | Boron Nitride | Spherical Shape | 60 | 60 | 1.7 | ◯◯ |
| Ex. 4 | 67/3/30 | 0.100 | A | Boron Nitride | Spherical Shape | 60 | 60 | 1.9 | ◯◯ |
| Ex. 5 | 57/3/40 | 0.100 | A | Boron Nitride | Spherical Shape | 60 | 60 | 2.1 | ◯◯ |
| Ex. 6 | 45/10/50 | 0.200 | A | Boron Nitride | Spherical Shape | 60 | 60 | 3.0 | ◯◯ |
| Ex. 7 | 30/30/40 | 0.750 | B | Boron Nitride | Spherical Shape | 60 | 60 | 2.3 | ◯ |
| Ex. 8 | 15/45/40 | 1.125 | B | Boron Nitride | Spherical Shape | 60 | 60 | 2.7 | Δ |
| Ex. 9 | 57/3/40 | 0.075 | A | Alumina | Spherical Shape | 36 | 60 | 1.3 | ◯ |
| Ex. 10 | 17/3/80 | 0.038 | A | Alumina | Spherical Shape | 36 | 60 | 1.5 | ◯ |
| Ex. 11 | 57/3/40 | 0.075 | A | Crushed Alumina | Unspecified Shape | 36 | 60 | 1.2 | ◯ |
| Ex. 12 | 57/3/40 | 0.075 | A | Aluminum Nitride | Spherical Shape | 200 | 45 | 1.9 | ◯ |
| Comp. Ex. 1 | 70/0/30 | 0.000 | — | Boron Nitride | Spherical Shape | 60 | 60 | 1.0 | ◯ |
| Comp. Ex. 2 | 5/0/95 | 0.000 | — | Boron Nitride | Spherical Shape | 60 | 60 | 5.3 | X |
| Comp. Ex. 3 | 70/30/0 | — | A | — | — | — | — | 0.7 | ◯◯ |

EXPLANATION OF SYMBOLS

1: Cured product
11: Cured product portion
12: Boron nitride nanotube
13: Insulating filler

The invention claimed is:

1. A thermosetting material, comprising:
a thermosetting compound;
a thermosetting agent;
boron nitride nanotubes; and
an insulating filler not being a nanotube,
the thermosetting compound being a styrene compound, a phenoxy compound, an oxetane compound, an epoxy compound, an episulfide compound, a (meth)acrylic compound, a phenol compound, an amino compound, an unsaturated polyester compound, a polyurethane compound, a silicone compound or a polyimide compound,
the thermosetting compound comprising both of (A1) a thermosetting compound having a molecular weight of less than 10000, and (A2) a thermosetting compound having a molecular weight of 10000 or more, and
the boron nitride nanotubes being single-walled tubes or multi-walled tubes,
the insulating filler having a heat conductivity of 10 W/m·K or more,
the average particle diameter of the insulating filler being 1 μm or more and 100 μm or less,
the insulating filler being a spherical particle which has an aspect ratio of 2 or less, and
the material of the insulating filler being boron nitride.

2. The thermosetting material according to claim 1, wherein the content of the boron nitride nanotube is 0.1% by volume or more and 40% by volume or less in 100% by volume of the ingredients (Y),
wherein when the thermosetting material comprises no solvent, the ingredients (Y) refers to all ingredients comprised in the thermosetting material, and
wherein when the thermosetting material comprises a solvent, the ingredients (Y) refers to ingredients other than the solvent among ingredients comprised in the thermosetting material.

3. The thermosetting material according to claim 1, wherein the content of the insulating filler is 25% by volume or more and 90% by volume or less in 100% by volume of the ingredients (Y),
wherein when the thermosetting material comprises no solvent, the ingredients (Y) refers to all ingredients comprised in the thermosetting material, and
wherein when the thermosetting material comprises a solvent, the ingredients (Y) refers to ingredients other than the solvent among ingredients comprised in the thermosetting material.

4. The thermosetting material according to claim 1, wherein the ratio of the content of the boron nitride nanotube in 100% by volume of the thermosetting material to the content of the insulating filler in 100% by volume of the thermosetting material is 0.001 or more and 1.6 or less.

5. The thermosetting material according to claim 1, wherein the average diameter of the boron nitride nanotube is 2 nm or more and 300 nm or less and the average length of the boron nitride nanotube is 1 μm or more and 200 μm or less.

6. The thermosetting material according to claim 1, wherein the ratio of the average length of the boron nitride nanotube to the average particle diameter of the insulating filler is 0.01 or more and 200 or less.

7. The thermosetting material according to claim 1, being a thermosetting sheet.

8. A cured product of the thermosetting material according to claim 1.

9. The thermosetting material according to claim 1, wherein the content of the thermosetting compound is 10% by weight or more in 100% by weight of ingredients (X), wherein when the thermosetting material comprises no solvent, the ingredients (X) refers to ingredients other than the boron nitride nanotubes and the insulating filler among ingredients comprised in the thermosetting material, and wherein when the thermosetting material comprises a solvent, the ingredients (X) refers to ingredients other than the solvent, the boron nitride nanotubes, and the insulating filler among ingredients comprised in the thermosetting material.

10. The thermosetting material according to claim 1, wherein the thermosetting compound is a phenoxy compound, an oxetane compound, an epoxy compound, an episulfide compound, a (meth)acrylic compound, a phenol compound, an amino compound, an unsaturated polyester compound, a polyurethane compound, a silicone compound or a polyimide compound.

11. The thermosetting material according to claim 1, wherein the average length of the boron nitride nanotubes is 1 μm or more and 50 μm or less.

12. The thermosetting material according to claim 1, further comprising a chelating agent.

13. The thermosetting material according to claim 1, wherein 80% or less of a total number of particles of the insulating filler have a surface in contact with a boron nitride nanotube.

14. The thermosetting material according to claim 1, wherein (A1) the thermosetting compound having a molecular weight of less than 10000 is a thermosetting compound having an epoxy group, and (A2) the thermosetting compound having a molecular weight of 10000 or more is a phenoxy resin or an epoxy resin.

* * * * *